United States Patent [19]
Traub et al.

[11] Patent Number: 5,940,810
[45] Date of Patent: Aug. 17, 1999

[54] ESTIMATION METHOD AND SYSTEM FOR COMPLEX SECURITIES USING LOW-DISCREPANCY DETERMINISTIC SEQUENCES

[75] Inventors: Joseph F. Traub; Spassimir Paskov, both of New York, N.Y.; Irwin F. Vanderhoof, Towaco, N.J.

[73] Assignee: The Trustees of Columbia University in the City of New York, New York, N.Y.

[21] Appl. No.: 08/902,921

[22] Filed: Jul. 30, 1997

Related U.S. Application Data

[63] Continuation of application No. 08/285,902, Aug. 4, 1994, abandoned.

[51] Int. Cl.[6] .................................................. G06F 17/60
[52] U.S. Cl. ............................................... 705/36; 705/37
[58] Field of Search .............................. 705/35, 36, 37, 705/8

[56] References Cited

U.S. PATENT DOCUMENTS

| | | | |
|---|---|---|---|
| 4,953,085 | 8/1990 | Atkins | 364/408 |
| 5,148,365 | 9/1992 | Dembo | 364/408 |
| 5,193,056 | 3/1993 | Boes | 364/408 |

OTHER PUBLICATIONS

Niederreiter, H., "Random Number Generation and Quasi–Monte Carlo Methods", CBMS–NSF, 63, Siam, Philadelphia 1992, pp. 1–45.

M. Karlos et al., "Monte Carlo Methods", John Wiley & Sons, 1986 pp. 89–117.

H. Wozniakowski, "Average Case Complexity of Linear Multivariate Problems", Journal of Complexity 8 pp. 373–392, 1992.

H. Wozniakowski, "Average Case Complexity of Multivariate Integration", Bulletin of Amer. Math. Society, vol. 24, No. 1, Jan. 1991, pp. 185–194.

B.W. Kernighan et al., *The Programming Language C*, Prentice–Hall, 1978, Cover Page and Table of Contents only.

H. Niederreiter, Random Number Generation and Quasi–Monte Carlo Methods, *CBMS–NSF*, 63, SIAM, Philadelphia, 1992. Cover Page and Table of Contents only.

S. Paskov, "Average Case Complexity of Multivariate Integration for Smooth Functions", *Journal of Complexity*, vol. 9 (1993), pp. 291–312.

W. Press et al., *Numerical Recipes in C*, Cambridge University Press, 1992, Cover page and Table of Contents only.

M. Kalos et al., *Monte Carlo Methods*, John Wiley & Sons, 1986, Cover Page, Preface and Table of Contents only.

P. Bratley, B. L. Fox and H. Niederreiter, "Implementation and Tests of Low–Discrepancy Sequences", *ACM Transactions on Modeling and Computer Simulation*, vol. 2 (1992), pp. 195–213.

E. J. Janse van Rensburg et al., "Estimation of Multidimensional Integrals: Is Monte Carlo the Best Method?", *J. Phys. A: Math. Gen.*, vol. 26 (1993), pp. 943–953.

I.M. Sobol, *A Primer for the Monte Carlo Method*, CRC Press, 1994, pp. 99, 104.

B. Moskowitz et al., "Smoothness and Dimension Reduction in Quasi–Monte Carlo Methods", *Mathematical and Computational Modelling*, vol. 23 (1996), pp. 37–54.

S. Tezuka, *Uniform Random Numbers: Theory and Practice*, Kluwer Academic Publishers, 1995, pp. xi–xii.

(List continued on next page.)

*Primary Examiner*—Robert A. Weinhardt
*Attorney, Agent, or Firm*—Baker & Botts, L.L.P.

[57] ABSTRACT

In securities trading, in setting the initial offering price of a financial instrument, or in later revaluation as financial parameters such as interest rates may change, an estimate of the value of the instrument may be represented as a multi-dimensional integral. For evaluation of the integral, numerical integration is preferred with the integrand being sampled at deterministic points having a low-discrepancy property. The technique produces approximate values at significant computational savings and with greater reliability as compared with the Monte Carlo technique.

22 Claims, 5 Drawing Sheets

OTHER PUBLICATIONS

S. Tezuka, "A Generalization of Faure Sequences and its Efficient Implementation", *IBM Research Report RT0105*, Nov. 14, 1994, pp. 1, 5, 6, 10.

S. Ninomiya and S. Tezuka, "Toward Real–time Pricing of Complex Financial Derivatives", *Applied Mathematical Finance*, vol. 3 (1996), pp. 1, 2, 20.

S.H. Paskov, "Computing High–dimensional Integrals with Applications to Finance", *Columbia University Technical Report CUCS–023–94*, pp. 1–20.

J. Case, "Wall Street's Dalliance with Number Theory", *SIAM News*, Dec. 1995, pp. 8–9.

B. Cipra, *What's Happening in the Mathematical Sciences (1995–1996)*, vol. 3, American Mathematical Society, 1996, pp. 101–111.

５,９４０,８１０

ESTIMATION METHOD AND SYSTEM FOR COMPLEX SECURITIES USING LOW-DISCREPANCY DETERMINISTIC SEQUENCES

This application is a continuation of application Ser. No. 08/285,902, filed on Aug. 4, 1994, now abandoned.

SPECIFICATION

The United States Government has certain rights to this invention pursuant to grants CCR-91-14042 and IRI-92-12597 awarded by the National Science Foundation, and to grant AFOSR-91-0347 awarded by the U.S. Air Force.

BACKGROUND OF THE INVENTION

The invention relates to financial securities trading such as, e.g., trading in stocks, bonds and financial derivative instruments, including futures, options and collateralized mortgage obligations.

In financial securities trading, which includes the initial offer for sale, the value of a security may be estimated, e.g., based on expected future cash flow. Such cash flow may depend on variable interest rates, for example, and these and other relevant variables may be viewed as stochastic variables.

It is well known that the value of a financial security which depends on stochastic variables can be estimated in terms of a multi-dimensional integral. The dimension of such an integral may be very high.

In collateralized mortgage obligations (CMO), for example, instruments or securities variously called tranches, shares, participations, classes or contracts have cash flows which are determined by dividing and distributing the cash flow of an underlying collection or pool of mortgages on a monthly basis according to pre-specified rules. The present value of a tranche can be estimated on the basis of the expected monthly cash flows over the remaining term of the tranche, and an estimate of the present value of a tranche can be represented as a multi-dimensional integral whose dimension is the number of payment periods of the tranche. For a typical instrument with a 30-year term and with monthly payments, this dimension is 360.

Usually, such a high-dimensional integral can be evaluated only approximately, by numerical integration. This involves the generation of points in the domain of integration, evaluating or "sampling" the integrand at the generated points, and combining the resulting integrand values, e.g., by averaging. Well known for numerical integration in securities trading is the so-called Monte Carlo method in which points in the domain of integration are generated at random.

With integrands arising in financial securities trading, the computational work in combining the sampled values is negligible as compared with producing the integrand values. Thus, numerical integration methods in securities trading may be compared based on the number of samples required for obtaining a sufficiently accurate approximation to the integral.

SUMMARY OF THE INVENTION

A preferred method for estimating the value of a financial security involves numerical integration unlike Monte Carlo integration in that an integrand is sampled at deterministic points having a low-discrepancy property. As compared with the Monte Carlo method, significant advantages are realized with respect to speed, accuracy, and dependability.

A computed estimate can be used in setting an offering price, e.g., somewhat higher than the estimate. An estimate can be used also in deciding whether to buy, hold or sell the security. For example, if the estimate exceeds the price at which the security is being offered for sale, a "buy" recommendation is appropriate.

Further included is an Appendix with two computer algorithms in "C" source language, respectively for computing Sobol points and Halton points. For a description of C, see B. W. Kernighan et al., *The Programming Language C*, Prentice-Hall, 1978.

DETAILED DESCRIPTION OF PREFERRED EMBODIMENTS

Figure 1:
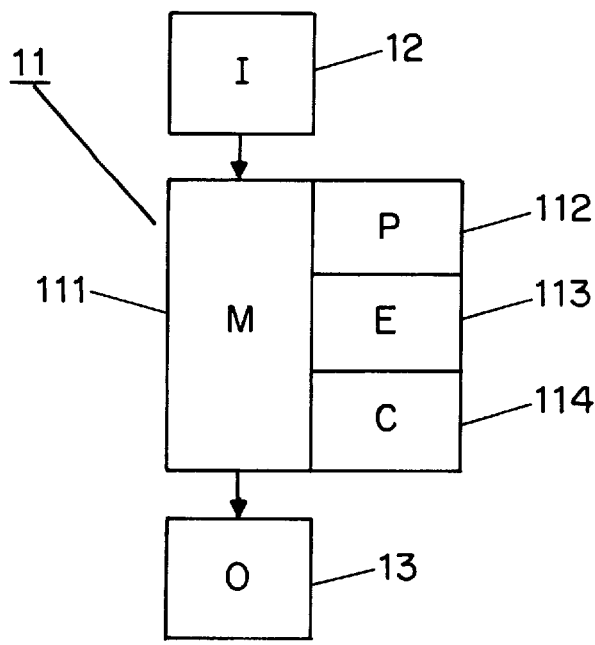
FIG. 1 is a schematic of a programmed computer system in accordance with a preferred embodiment of the invention.
Figure 3:
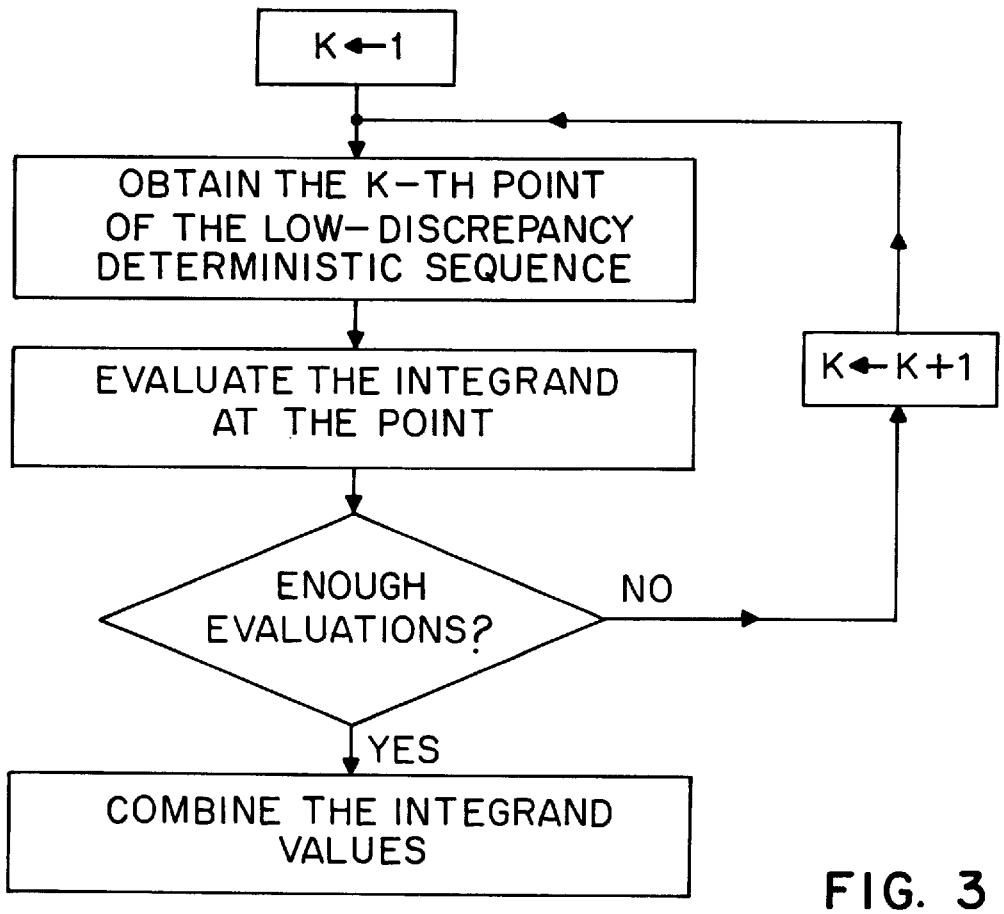
FIG. 3 is a flow diagram of a preferred embodiment of a method in accordance with the invention.

FIG. 1 shows a stored-program computer 11 connected to input means 12, e.g., a keyboard, for entering financial securities data, and connected to output means 13, e.g., a visual display device, for displaying an estimated value of the financial security. The computer 11 includes a working memory 111(M), a low-discrepancy deterministic point generator 112(P), an integrand evaluator 113(E), and an integrand-value combiner 114(C).

In estimating the value of a multi-dimensional integral in financial securities trading, a multivariate integrand is sampled at points corresponding to a low-discrepancy deterministic sequence of points in the multivariate unit cube as defined below. If the multivariate unit cube is also the domain of integration, the points of the low-discrepancy deterministic sequence can be used as sample points directly. In the case of a more general domain of integration, sample points correspond to points of a low-discrepancy deterministic sequence in the multivariate unit cube via a suitable transformation or mapping.

When a sufficiently large number of sampled values has been computed, an approximation of the integral is obtained by suitably combining the computed values, e.g., by averaging or weighted averaging.

In the d-dimensional unit cube $D=[0,1]^d$, a low-discrepancy deterministic sequence $Z_1, Z_2, \ldots$ of points in D can be characterized as follows:

For a point $t=[t_1, \ldots, t_d]$ in D, define $$[0, t) = [0, t_1) \times \ldots \times [0, t_d),$$

where $[0, t_i)$ denotes a left-closed, right-open interval, and denote with $X_{[0, t)}(.)$ the characteristic or indicator function of $[0, t)$. For points $Z_1, \ldots, Z_n$ in D, define $$R_n(t; Z_1, \ldots, Z_n) = (\Sigma_{k=1}^n \chi_{[0,t)}(Z_k))/n - t_1 t_2 \ldots t_d,$$

and define the discrepancy of $Z_1, \ldots, Z_n$ as the $L_\infty$-norm of the function $R_n(.; z_1, \ldots, Z_n)$, i.e., $$\|R_n(.; Z_1, \ldots, Z_n)\|_\infty = \sup_{t \in D} |R_n(t; Z_1, \ldots, Z_n)|.$$

The sequence $Z_1, Z_2, \ldots$ is said to be a low-discrepancy deterministic sequence provided $$\|R_n(.; Z_1, \ldots, Z_n)\|_\infty = O((\log n)^d/n).$$

Low-discrepancy deterministic sequences are described in the published literature; see, e.g., H. Niederreiter, "Random Number Generation and Quasi-Monte Carlo Methods", *CBMS-NSF*, 63, SIAM, Philadelphia, 1992 and S. Paskov, "Average Case Complexity of Multivariate Integration for Smooth Functions", *Journal of Complexity*, Vol. 9 (1993), pp. 291–312. Well-known examples of low-discrepancy deterministic sequences are the so-called Hammersley points, Halton points, Sobol points, and hyperbolic-cross points.

For illustration, in the case of Sobol points in a single dimension (d=1), a constructive definition may be given as follows: Choose a primitive polynomial $$P(x) = x^n + a_1 x^{n-1} + \ldots + a_{n-1} + 1$$

(whose coefficients $a_i$ are either 0 or 1) and define so-called direction numbers $v_i$, i>n by the following recurrence formula:

$$v_i = a_1 v_{i-1} \oplus a_2 v_{i-2} \oplus \ldots \oplus a_{n-1} v_{i-n+1} \oplus v_{i-n} \oplus (v_{i-n}/2^n),$$

where $\oplus$ denotes a bit-by-bit "exclusive or" operation.

The initial numbers $v_1 = m_1/2, \ldots, v_n = m_n/2^n$ can be chosen freely provided $m_i$ is odd and $0 < m_i < 2^i$ for $i = 1, 2, \ldots, n$.

Using the direction numbers $v_i$ so defined, now define the one-dimensional Sobol sequence $x_1, x_2, \ldots$ by $$x_k = b_1 v_1 \oplus b_2 v_2 \oplus \ldots \oplus b_w v_w, k \geq 0$$

where $k = \Sigma_{i=0}^{[\log k]} b_i 2^i$ is the binary representation of k.

For higher dimensions (d>1), the first d primitive polynomials $P_1, P_2, \ldots, P_d$ are used. If $\{x_k^i\}_{k=1}^\infty$ denotes the one-dimensional Sobol sequence generated by the polynomial $P_i$, the d-dimensional Sobol points are defined as $X_k = (x_k^1, x_k^2, \ldots, x_k^d)$.

While this definition can be implemented as a computer algorithm directly, faster techniques are known which produce these points in a "shuffled" or permuted sequence. In particular, this applies to the computer algorithm given in the Appendix.

For specificity in the following, a preferred embodiment of the invention is described as applied to a collateralized mortgage obligation known as CMO FN, 89-23. This has thirty-year maturity and consists of the following tranches:

PAC tranches 23-A, 23-B, 23-C, 23-D, 23-E supporting tranches 23-G, 23-H, 23-J residual tranche 23-R accrual tranche 23-Z The monthly cash flow is divided and distributed according to pre-specified rules which are included in a formal prospectus. Some of the basic rules may be stated as follows:

First from the monthly cash flow, the coupon is paid to the tranches. The remaining amount, called Principal Distribution Amount, is used for repayment of the principal. Prior to a fixed date in the future, the Principal Amount will be allocated sequentially to the tranches 23-G, 23-H, 23-J and 23-Z. After that date, the Principal Distribution Amount will be allocated sequentially to the tranches 23-A, 23-B, 23-C, 23-D and 23-E according to a planned schedule. Any excess amount of the Principal Distribution Amount over the planned schedule will be allocated sequentially to the tranches 23-G, 23-H, 23-J and 23-Z. A distribution of principal of the tranche 23-R will be made only after all other tranches have been retired.

In deriving an estimate for the present value of the security at the time of issue, the following notation is used below:

C—the monthly payment on the underlying mortgage pool;

$i_k$—the projected interest rate in month k, k=1, 2, ..., 360;

$w_k$—the percentage of mortgages prepaying in month k;

$a_{360-k+1}$—the remaining annuity after month k.

A remaining annuity $a_k$ can be expressed as3 to $$a_k = 1 + v_0 + \ldots + v_0^{k-1}, k=1, 2, \ldots, 360,$$

with $v_0 1/(1+i_0)$, where $i_0$ is the current monthly interest rate. Thus, after k months, the remaining amount of principal borrowed is $C \cdot a_k$.

It is assumed that the interest rate $i_k$ can be expressed as $$i_k = K_0 \exp(\xi_k) i_{k-1},$$

where exp(.) denotes exponentiation and where $\xi_1, \xi_2, \ldots, \xi_{360}$ are independent, normally distributed random variables with mean 0 and variance $\sigma^2$, and $K_0$ is a given constant. For the present example, $\sigma^2 = 0.0004$ is chosen.

It is assumed further that $w_k$ as a function of $i_k$ can be computed as $$w_k = K_1 + K_2 \arctan(K_3 i_k + K_4),$$

where $K_1, K_2, K_3, K_4$ are given constants.

Under these assumptions. the cash flow in month k, k=1, 2, ..., 360 is $$C(1-w_1(\xi_1)) \ldots (1-w_{k-1}(\xi_1, \ldots, \xi_{k-1}))(1-w_k(\xi_1, \ldots, \xi_k)) + w_k(\xi_1, \ldots, \xi_k) a_{360-k+1}),$$

where $$w_k(\xi_1, \ldots, \xi_k) = K_1 + K_2 \arctan(K_3 K_0^k i_0 \exp(\xi_1 + \ldots + \xi_k) + K_4).$$

This cash flow is distributed according to the rules of FN, 89-23. Then, the cash flow for each of the tranches is multiplied by the discount factor $$v_1(\xi_1) \ldots v_k(\xi_1, \ldots, \xi_k),$$

with $$v_j(\xi_1, \ldots, \xi_j) = 1/(1+K_0^j i_0 \exp(\xi_1 + \ldots + \xi_j)), j=1,2, \ldots, 360,$$

to find the present value for month k. Summing of the present values for every month gives the present value $PV_T$, for each tranche T.

The expected or estimated value, $$E(PV_T) = E(PV_T(\xi_1, \ldots, \xi_{360})),$$

upon a change of variables is represented by $$E(PV_T) = \int_D PV_T(y_1(x_1), \ldots, y_{360}(x_{360})) dx_1 \ldots dx_{360},$$

where

-continued $$x_i = (2\pi\sigma)^{-1/2} \int_{-\infty}^{y_i} \exp(-t^2/(2\sigma)) dt.$$

Thus, for each tranche T, a 360-variate integrand has to be integrated over the 360-dimensional unit cube.

After generating a point $$(x_1, x_2, \ldots, x_{360})$$

of a low-discrepancy deterministic sequence in the unit cube, the point $$(y_1, Y_2, \ldots, Y_{360})$$

is computed by finding the value of the inverse normal cumulative distribution function at each $X_k$. Then, for each tranche T, the function value $$PV_T(y_1, y_2, \ldots, y_{360})$$

is computed. These are the function values used in numerical integration.

Figure 2:
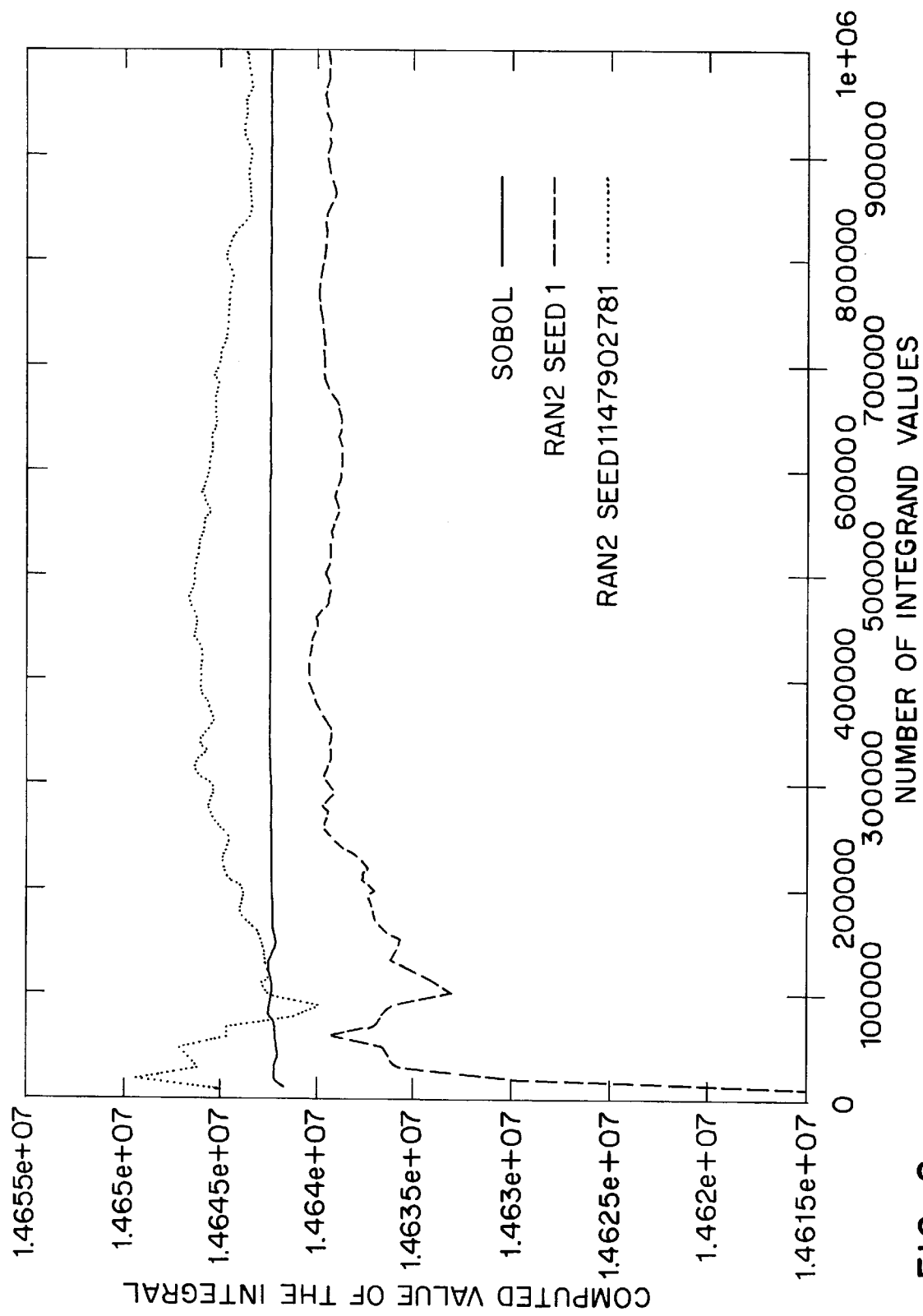
FIG. 2 is a graphic representation of performance data obtained in computer trial runs with an exemplary embodiment of the invention as compared with two Monte Carlo computations.
Figure 4:
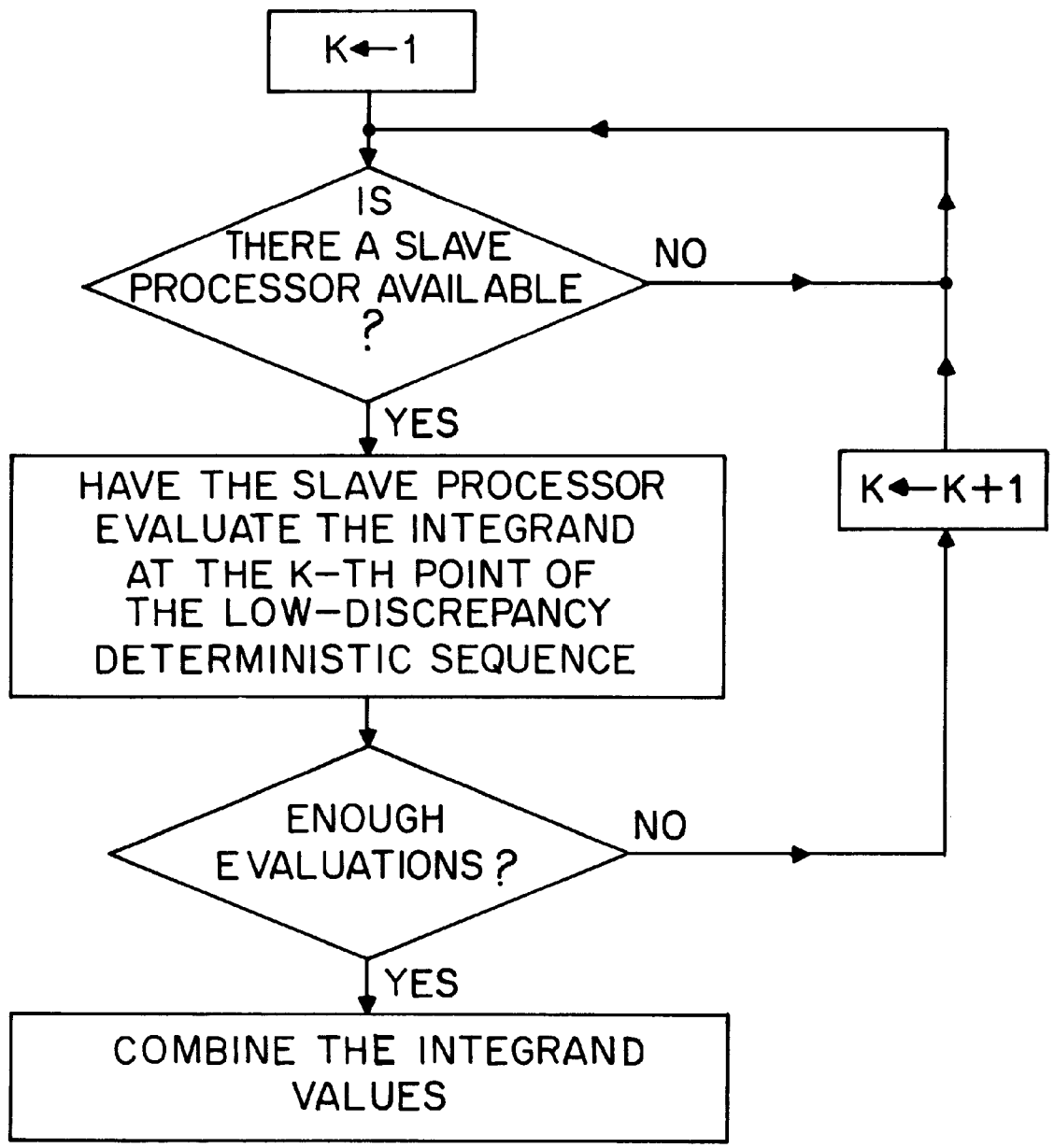
FIG. 4 is a flow diagram of a preferred further embodiment of the invention, including the use of multiple processors.
Figure 5:
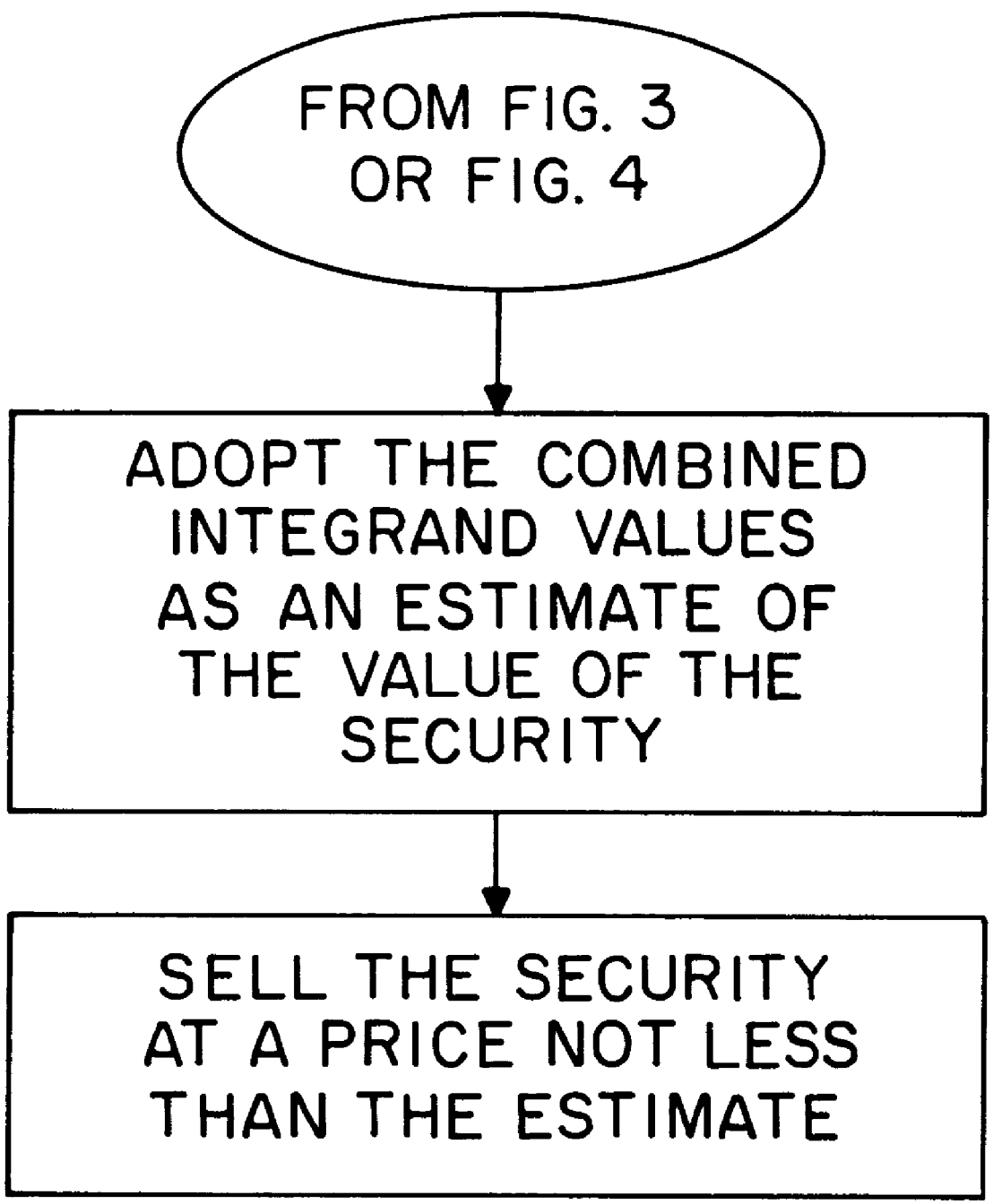
FIG. 5 is a flow diagram of initially selling a complex security in accordance with a preferred embodiment of the invention.
Figure 6:
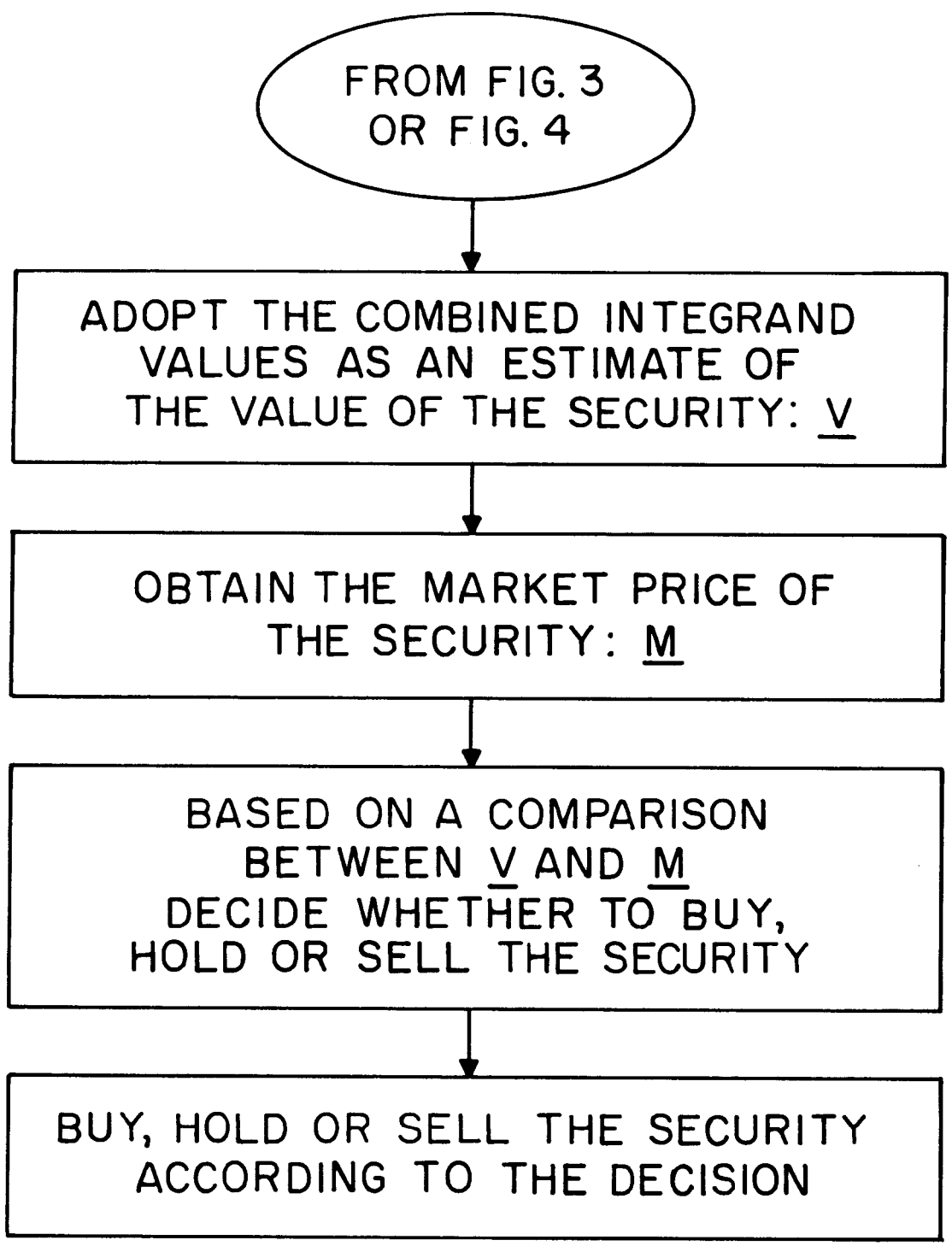
FIG. 6 is a flow diagram of buying/holding/selling a complex security in accordance with a preferred further embodiment of the invention.

FIG. 2 shows results from trial runs for CMO FN, 89-23 with a preferred method using Sobol points generated by the corresponding computer algorithm given in the Appendix, as compared with Monte Carlo integration. Two Monte Carlo computations were carried out, with different "seeds" or starting values of a congruential pseudo-random number generator known as RAN2; see W. Press et al., *Numerical Recipes in C*, Cambridge University Press, 1992. It is apparent that the preferred method reaches a steady value more rapidly. In this and other trial runs, with typical requirements of precision and confidence, a speed-up by a factor of 3 to 5 was realized as compared with Monte Carlo integration. Much greater speed-up can be expected when higher precision or/and higher levels of confidence are sought.

In a further trial run with CMO FN, 89-23, instead of Sobol points, Halton points were used as generated by the corresponding computer algorithm given in the Appendix. It is felt that Sobol points may be preferred over Halton points for integrals of high dimension. However, this preference may not apply in the case of lower-dimensional integrals, e.g., with dimension up to 5 or so.

A computation as described may be terminated after a predetermined number of function evaluations. Alternatively, e.g., after every function evaluation or after a predetermined incremental number of function evaluations, a current approximation may be compared with one or several preceding approximations, for termination once a suitable condition depending on the difference between approximations is met. Such termination criteria may be called automatic. Automatic termination is particularly reliable where a sequence of approximations settles down smoothly; see, e.g., the curve in FIG. 2 corresponding to Sobol points.

Advantageously in computing function values, a cluster or network of multiple parallel processors or workstations can be used. This may involve a master or host processor providing points of a low-discrepancy sequence to slave processors and combining function values returned by the slave processors into an approximate value for the integral. Thus, the computation can be speeded up in proportion to the number of processors used.

Advantageous further, in combination with numerical integration as described above, is the use of error reduction techniques analogous to variance reduction in Monte Carlo integration as described, e.g., by M. Kalos et al., *Monte Carlo Methods*, John Wiley & Sons, 1986. This may involve a change of variables or/and variation reduction, for example.

APPENDIX

```
/*******************************************************************
                void sobol(int n)
                    This is the function sobol for generating Sobol points. It returns the n-th
                    d-dimensional Sobol point. (The point (0,0, . . . , 0) is skipped.) The point is
                    implicitly returned through the array x. The function sobseq from Numerical
                    Recipes, 1992 was used as a basis, but changed significantly to accomodate the
                    parallel distributed approach. The function sobol can generate Sobol points
                    skipping an initial part of the sequence. The constant MAXDIM, see Numerical
                    Recipes, is extended to 360 which required adding more initializing data to
                    the arrays ip (the primitive polynomials), mdeg (their degrees), and iv (the
                    initial direction numbers). The polynomial x is used to generate the first
                    coordinate of Sobol points.
 *******************************************************************/
#include "nrutil.h"
#define MAXBIT 30
#define MAXDIM 360
extern int d;        /* actual dimension of the points */
extern double *x;    /* This returns implicitly the n-th Sobol point in x */
void sobol(int n)
{
    int j,k,l;
    unsigned long i,im,ipp;
    static double fac;
    static unsigned long in, ix[MAXDIM+1], *iu[MAXBIT+1];
    static unsigned long mdeg[MAXDIM+1]={0,MAXBIT,1,2,3,3,4,4,
                            5,5,5,5,5,5,
                            6,6,6,6,6,6,
                            7,7,7,7,7,7,7,7,7,7,7,7,7,7,7,7,7,
/*16*/                      8,8,8,8,8,8,8,8,8,8,8,8,8,8,8,8,
                            9,9,9,9,9,9,9,9,9,9,9,9,9,9,9,
                            9,9,9,9,9,9,9,9,9,9,9,9,9,9,9,
                            9,9,9,9,9,9,9,9,9,9,9,9,9,9,9,
/*20*/                10,10,10,10,10,10,10,10,10,10,10,10,10,10,10,10,10,10,10,
                  10,10,10,10,10,10,10,10,10,10,10,10,10,10,10,10,10,10,10,
```

APPENDIX-continued

```
                10,10,10,10,10,10,10,10,10,10,10,10,10,10,10,10,10,10,10,10,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,11,11,11,
                11,11,11,11,11,11,11,11,11,11,11,11,11,11,11,11,11,
                12,12,12,12,12,12,12,12,12,12,12,12,12,12,12,12,12,12,12,12,
                12,12,12
                };
    /* The first coordinate is set to MAXBIT, but it is never used */
    static unsigned long ip[MAXDIM+1]={0,MAXBIT,0,1,1,2,1,4,
/*deg 5*/                        2,13,7,14,11,4,
/*deg 6*/                        1,16,13,22,19,25,
/*deg 7*/               1,32,4,8,7,56,14,28,19,15,21,42,31,62,37,41,55,59,
/*deg 8*/               14,56,21,22,38,47,49,50,52,67,70,84,97,103,115,122,
/*deg 9*/          8,13,16,22,25,44,47,52,55,59,62,67,74,81,82,87,91,94,
           103,104,109,122,124,137,138,143,145,152,157,167,173,176,181,182,186,
           191,194,199,218,220,227,229,230,223,236,241,244,253
/*deg 10*/          4,13,19,22,50,55,64,69,98,107,115,121,127,134,110,145,152,
           158,161,171,181,194,199,203,208,227,242,251,253,265,266,274,283,289,295,
           301,316,319,324,346,352,361,367,382,395,398,400,412,419,422,426,428,433,
           446,454,457,472,493,505,508,
/*deg 11*/ 2,11,21,22,35,49,50,56,61,70,74,79,84,88,103,014,112,115,117,122,134,
           137,146,148,157,158,162,164,168,173,185,186,191,193,199,213,214,220,227,
           236,242,251,256,259,265,266,276,292,304,310,316,319,322,338,334,339,341,
           345,346,362,367,372,375,376,381,385,388,392,409,415,416,421,428,431,434,
           439,446,451,453,457,458,471,475,478,484,493,494,499,502,517,518,524,527,
           555,560,565,569,578,580,587,589,590,601,607,611,614,617,618,625,628,635,
           641,647,654,659,662,672,675,682,684,689,695,696,713,719,724,733,734,740,
           747,749,752,755,762,770,782,784,787,789,793,796,803,805,810,815,824,829,
           830,832,841,847,849,861,871,878,889,892,901,908,920,923,942,949,950,954,
           961,968,971,973,979,982,986,998,1001,1010,1012,
*deg12*/   41,52,61,62,76,104,117,131,143,145,157,167,171,176,181,194,217,236,
           239,262,283,286,307};
    static unsigned long iV[MAXDIM*MAXBIT+1]={
        0, /* 40 elements in a row */
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1,1,1,1,1,1,1,1,1,1,
/*end 1 */
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,4,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
1,3,1,3,1,3,1,3,3,1,3,1,3,1,3,1,1,3,1,3,1,3,1,3,3,1,3,1,3,1,3,1,1,3,1,3,1,3,1,3,
/*end 2 */
1,5,7,7,5,1,3,3,7,5,5,7,7,1,3,3,7,5,1,1,5,3,3,1,7,5,1,3,3,7,5,1,1,5,7,7,5,1,3,3,
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
1,5,7,7,5,1,3,3,7,5,5,7,7,1,3,3,7,5,1,1,5,3,3,1,7,5,1,3,3,7,5,1,1,5,7,7,5,1,3,3
/*end 3 */
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
```

APPENDIX-continued 1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9,
1,15,11,5,3,1,7,9,13,11,1,3,7,9,5,13,13,11,3,15,5,3,15,7,9,13,9,1,11,7,5,15,1,15,
11,5,3,1,7,9, /*end 4 */
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9,
1,17,13,7,15,9,31,9,3,27,15,29,21,23,19,11,25,7,13,17,1,25,29,3,31,11,5,23,27,19,
21,5,1,17,13,7,15,9,31,9, /*end 5 */
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25,
1,51,61,43,51,59,47,57,35,53,19,51,61,37,33,7,5,11,39,63,27,17,15,23,29,3,21,13,
31,25,9,49,33,19,29,11,19,27,15,25, */end 6 */
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107,
1,85,67,49,125,25,109,43,89,69,113,47,55,97,3,37,83,103,27,13,33,115,41,79,17,29,
119,75,73,105,7,59,65,21,3,113,61,89,45,107, /*end 7*/
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39,
1,255,79,147,141,89,173,43,9,25,115,97,19,97,197,101,255,29,203,65,195,177,105,

APPENDIX-continued 17,47,169,109,149,15,213,135,253,191,155,175,63,47,7,23,39,
1,255,79,147,141,89,173,43,9,25,115,97,19,97,197,101,255,29,203,65,195,177,105,
17,47,169,109,149,15,213,135,253,191,155,175,63,47,7,23,39, /*end 8 */
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
1,257,465,439,177,321,181,225,235,103,411,233,59,353,329,463,385,111,475,451,263,
19,249,275,369,393,167,333,473,469,101,21,451,229,247,297,403,497,61,361,
/*end 9 */
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
1,771,721,1013,759,835,949,113,929,615,157,39,761,169,983,657,647,581,505,833,139,
147,203,81,337,829,989,375,365,131,215,733,451,447,177,57,471,979,197,251,
/*end 10 */
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
1,1285,823,727,267,833,471,1601,1341,913,1725,2021,1905,375,893,1599,415,605,819,
975,915,1715,1223,1367,663,629,525,469,981,1667,1587,1251,451,481,721,483,1209,
1457,415,1435,
/*end 11 */
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,

APPENDIX-continued

```
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977,
1,3855,4091,987,1839,4033,2515,579,3863,977,3463,2909,3379,1349,3739,347,387,2881,
2821,1873,1959,1929,2389,3251,1149,243,3609,1131,1701,143,1339,3497,2499,1571,
983,4021,1625,3217,1163,2977, /*end 12 */
        };
        if (n < 0) }
            for(j=12;j<=MAXBIT;j++) iv[1+j*MAXDIM]=1; /* Initialize all direction
                                        numbers for the first
                                        coordinate to 1 */
            for (j=1,k=0;j<=MAXBIT;j++,k+=MAXDIM) iu[j] = &iv[k];
                for (k=1;k<=MAXDIM;k++) {
                    for (j=1;j<=mdeg[k];j++) iu[j][k] <<= (MAXBIT-j);
                    for (j=mdeg[k]+1;j<=MAXBIT;j++) {
                    ipp=ip[k];
                    i=iu[j-mdeg[k]][k];
                    i = (i >> mdeg[k]);
                    for (l=mdeg[k]-1;l>=1;l--) {
                        if (ipp & 1) i ^= iu[j-l][k];
                        ipp >>= 1;
                    }
                    iu[j][k]=i;
                    }
                }
            fac=1.0/(1L << MAXBIT);
            in=0;
        }
        else
        {
            /* Check if the (n-1)-th number was generated in the previous call
            to sobol. If not, update in and ix */
            if(in!=n-1) {
            unsigned long gray;
            /* set ix to 0 */
            for (k=1;k<=IMIN(d,MAXDIM);k++) ix[k]=0;
            in=n-1;
            gray=in (in>>1);    /* Find gray code of in */
            for (j=1;j<=MAXBIT;j++) {
                if(gray&1) {   /* Only digits which are 1 are used */
                im=(j-1)*MAXDIM;
                    for (k=1;k<=IMIN(d,MAXDIM); k++) ix[k] ^= iv[im+k];
                }
                gray>>=1;
            }
            }
            im=in;          /* Calculate the next vector in the sequence */
            for (j=1;j<=MAXBIT;j++) {   /* Find the rightmost zero bit */
            if (!(im & 1)) break;
            im >>= 1;
            }
            if (j > MAXBIT) nrerror("MAXBIT too small in sobseq");
            im=(j-1)*MAXDIM;
            for (k=1;k<=IMIN(d,MAXDIM);k++) {
            ix[k] ^= iv[im+k];
            x[k-1]=ix[k]*fac;
            }
            in++;
        }
}
#undef MAXBIT
#undef MAXDIM
/*****************************************************************************
    void halton(int n)
        This is the function halton for generating Halton points. It returns the n-th
        d-dimensional Halton point. The point is implicitly returned through the array x. The
        last two digits of n-1 in base p[j] are kept in q1[j] and q2[j].
        When both digits become p[j]-1, the radical inverse function is computed again.
```

APPENDIX-continued

That way the accumulation of round-off error is avoided. In practice, there are not
any upper bounds on the values of d and n.
*********************************************************************/

```
extern int d;    /* actual dimension of the points */
exern int *q1,*q2;  /* q1[j] is the last digit of n-1 in base p[j], q2[j] is
                        the digit before the last one */
extern double *x;   /* This will contain the Halton point */
extern int *p;    /* the first d prime numbers */
extern int *p_1;   /* first d prime numbers minus 1 */
extern double *incr1,*incr2;   /* incr1[j] is 1/p[j] and 1/(p[j]*p[j]) */
double find_fi(int p, int n); /* See below */
void halton(int n)
{
    double a;
    int j,nn;
    static int ins_n; /* The default value of ins_n is 0 */
    /* Check if the (n-1)-th number was generated in the previous call
        to halton. If not, update q1, q2, and x */
    if(ins_n!=n-1)
        {
          ins_n=n-1;
          for (j=0; j<d; j++)
          {
            q1[j]=ins_n%p[j];
            q2[j]=(ins_n/p[j])%p[j];
            x[j]=find_fi(p[j],ins_n);
          }
          ins_n++;
        }
    for(j=0;j<d;j++)
        {
            if(q1[j]<p_1[j])
            {
                /* It is easy to update when the last digit is less than p[j]-1 */
                q1[j]++;
                x[j]=x[j]+incr1[j];
            }
            else if(q2[j]<p_1[j])
            {
                /* This is the case when the last digit is p[j]-1 and the digit
                    before the last one is less than p[j]-1 */
                q1[j]=0;
                q2[j]++;
                x[j]=x[j]+incr1[j]+incr2[j]-1.0;
            }
            else
            {
                /* This is the case when the last digit is p[j]-1 and the digit
                    before the last one is also p[j]-1 */
                q1[j]=0;
                q2[j]=0;
                nn=n/(p[j]*p[j]);
                a=nn%p[j];
                nn=nn/p[j];
                if(nn) x[j]=(a+find_fi(p[j],nn))*incr2[j]*incr1[j];
                else x[j]=a*incr2[j]*incr1[j];
            }
        }
}
/*********************************************************************
    find_fi(int p, int n)
    This returns the radical inverse function fi(p,n) at n for the prime p.
*********************************************************************/
double find_fi(int p, int n)
{
    int p2,nn;
    double s,fi,incr;
    incr=1.0/p;
    p2=p*p;
    nn=n/p2;
    fi=0.0;
    s=incr;
    while (nn > 0)
        {
            fi+= (nn%p)*s;
            nn=nn/p;
            s*=incr;
        }
    /* The two largest components of fi are added later to avoid possible
```

APPENDIX-continued

```
    loss of precision */
    fi=((n/p%p)+ fi)/ p2;
    fi+=(n%p)/ (double) p;
    return fi;
}
```

We claim:

1. A method for one of buying, holding and selling a complex security, comprising:
   (i) deriving a multivariate integrand which, when integrated over a domain of integration having at least 50 dimensions, represents an estimated value of the security;
   (ii) calculating, by computer, integrand values at points in the domain of integration which are obtained from a low-discrepancy deterministic sequence;
   (iii) combining the integrand values, by computer, to approximate the estimated value; and
   (iv) effecting, based on the estimated value, one of buying, holding and selling the security.

2. The method of claim 1, wherein combining the integrand values comprises averaging.

3. The method of claim 1, wherein the number of integrand values is predetermined.

4. The method of claim 1, wherein the number of integrand values is determined automatically.

5. The method of claim 1, further comprising allocating integrand evaluations among a plurality of processors.

6. The method of claim 1, wherein the low-discrepancy deterministic sequence comprises Sobol points.

7. The method of claim 1, wherein the low-discrepancy deterministic sequence comprises Halton points.

8. The method of claim 1, wherein the low-discrepancy deterministic sequence comprises Hammersley points.

9. The method of claim 1, wherein the low-discrepancy sequence comprises hyperbolic-cross points.

10. The method of claim 1, wherein the security is a derivative instrument.

11. The method of claim 1, wherein the security is a financial security.

12. A method for selling a complex security, comprising:
    (i) deriving a multivariate integrand which, when integrated over a domain of integration having at least 50 dimensions, represents an estimated value of the security;
    (ii) calculating, by computer, integrand values at points in the domain of integration which are obtained from a low-discrepancy deterministic sequence;
    (iii) combining the integrand values, by computer, to approximate the estimated value; and
    (iv) selling the security at an offering price which is not less than the estimated value.

13. The method of claim 12, wherein combining the integrand values comprises averaging.

14. The method of claim 12, wherein the number of integrand values is predetermined.

15. The method of claim 12, wherein the number of integrand values is determined automatically.

16. The method of claim 12, further comprising allocating integrand evaluations among a plurality of processors.

17. The method of claim 12, wherein the low-discrepancy deterministic sequence comprises Sobol points.

18. The method of claim 12, wherein the low-discrepancy deterministic sequence comprises Halton points.

19. The method of claim 12, wherein the low-discrepancy deterministic sequence comprises Hammersley points.

20. The method of claim 12, wherein the low-discrepancy sequence comprises hyperbolic-cross points.

21. The method of claim 12, wherein the security is a derivative instrument.

22. The method of claim 12, wherein the security is a financial security.

* * * * *

UNITED STATES PATENT AND TRADEMARK OFFICE
CERTIFICATE OF CORRECTION

PATENT NO. : 5,940,810

DATED : August 17, 1999

INVENTOR(S) : Joseph F. Traub et al.

It is certified that error appears in the above-identified patent and that said Letters Patent is hereby corrected as shown below:

Item [75] Inventors: "Irwin F. Vanderhoof" should read -- Irwin T. Vanderhoof --. Column 2, line 7, "DRAWING" should read -- DRAWINGS --. Column 3, line 24, "$+a_{n-1} +1$" should read -- $+a_{n-1} x+1$ --. Column 4, line 15, "as3" should read -- as --.

Signed and Sealed this

Eighth Day of May, 2001

Attest:

NICHOLAS P. GODICI

Attesting Officer

Acting Director of the United States Patent and Trademark Office